United States Patent [19]

Sakurai

[11] 3,911,479

[45] Oct. 7, 1975

[54] COLOR SELECTIVE LOW PASS FILTER

[75] Inventor: Toshio Sakurai, Ohmiya, Japan

[73] Assignee: Fuji Shashin Koki Kabushiki Kaisha, Ohmiya, Japan

[22] Filed: June 21, 1973

[21] Appl. No.: 372,275

[30] Foreign Application Priority Data

June 23, 1972 Japan ................................ 47-63055

[52] U.S. Cl. ............. 358/44; 350/162 SF; 350/166; 350/314

[51] Int. Cl.$^2$ ............................................ H04N 9/06

[58] Field of Search ..................... 178/5.4 E, 5.4 ST; 350/162 SF, 163, 164, 165, 166, 188, 195, 196, 311, 314, 317

[56] References Cited

UNITED STATES PATENTS

| | | | |
|---|---|---|---|
| 2,543,477 | 2/1951 | Sziklai et al. | 350/317 |
| 2,769,111 | 10/1956 | Sadowsky | 350/317 |
| 3,681,519 | 8/1972 | Larsen et al. | 178/5.4 ST |

FOREIGN PATENTS OR APPLICATIONS

| | | | |
|---|---|---|---|
| 653,914 | 5/1951 | United Kingdom | 350/188 |

*Primary Examiner*—Robert L. Griffin
*Assistant Examiner*—George G. Stellar

[57] ABSTRACT

A low pass filter adapted to be used in the taking lens system of a color television camera is provided with thin transparent film stripes of a fine pitch which have the effect of causing red and blue light of high spatial frequency passing therethrough to interfere and be eliminated and allowing only green light to pass therethrough from the low to high spatial frequency.

4 Claims, 6 Drawing Figures

COLOR SELECTIVE LOW PASS FILTER

BACKGROUND OF THE INVENTION

1. Field of the Invention

This invention relates to an optical filter, more particularly to a low pass filter for use in a color television camera for eliminating high frequency signal components. The low pass filter in accordance with this invention is located for instance between an objective and a picture tube of a color television camera to improve the resolving power of the optical system of the television camera and obtain a sharp image.

2. Description of the Prior Art

In a recently developed color television system employing a single picture tube, a great problem exists in how to prevent an undesirable interference between the luminance signal and the color signal, or between color signals. Such an interference brings about false signals presenting a false image portion which is not included in the real object. It is impossible at present to eliminate the false signals by means of an electrical method, and accordingly the false signals have been eliminated by means of an optical method for eliminating high spatial frequency components. One of the conventional optical methods for eliminating the high spatial frequency components which has been put into practice is to insert a lenticular lens of comparatively fine pitch in front of the photoelectric conversion face.

In accordance with the conventional method as described above, it is true that the false signals are eliminated to some extent, but the sharpness of the image reproduced is deteriorated since the high spatial frequency components. are eliminated with respect to all kinds of color light, i.e. red, green and blue light.

A method or means is therefore desired for eliminating the false signals in the single tube color television camera system without degrading the sharpness of the color image.

SUMMARY OF THE INVENTION

In light of the above mentioned defect of the conventional method, the primary object of the present invention is to provide a means for eliminating the false signals in the single tube color television camera system without degrading the sharpness of the color image.

Another object of this invention is to provide an optical low pass filter for eliminating the high spatial frequency components of television signals to obtain a sharp image.

Still another object of this invention is to provide an optical low pass filter which eliminates the high spatial frequency components with respect to only red and blue light components of the light incident on the television camera and allows green light to pass through all the spatial frequencies thereof.

A further object of this invention is to provide an optical low pass filter which has markedly high efficiency in eliminating the high frequency components of red and blue components of light incident on a color picture tube.

In order to accomplish the above-mentioned objects, the low pass filter in accordance with the present invention is provided with thin transparent film strips of a fine pitch which have the effect of causing red and blue light of high spatial frequency passing therethrough to interfere and be eliminated and allowing only green light to pass therethrough from the low to high spatial frequency.

The reason why only green light is selected for passage through the filter throughout all spatial frequencies thereof is that the resolving power of human eyes with respect to green is much higher than other colors, and accordingly, the aim in selecting only green light is to obtain images of high resolving power and at the same time to prevent said false signals by eliminating high spatial frequency components of red and blue light.

The low pass filter of this invention is located theoretically on the aperture plane of the objective lens of a single tube color television camera for elimination of the high frequency component.

PREFERRED EMBODIMENTS OF THE INVENTION

Figure 1:
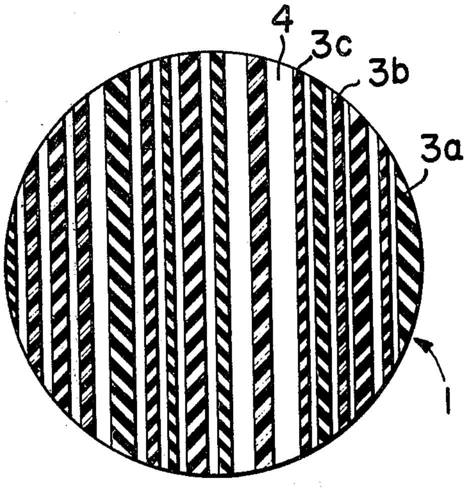
FIG. 1 is an enlarged partial plan view of the low pass filter in accordance with an embodiment of this invention.
Figure 2:
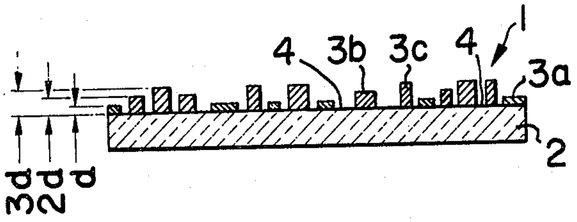
FIG. 2 is an enlarged partial sectional side view of the filter shown in FIG. 1.

Referring to FIGS. 1 and 2 showing an embodiment of this invention, the color selective low pass filter 1 in accordance with this invention comprises a transparent substrate 2 made of glass, plastic or the like and a number of striped filter layers *3a*, *3b*, *3c* of several kinds of thickness and of random width deposited on said transparent substrate 2 in parallel to each other.

The striped filter layers *3a*, *3b* and *3c* are transparent and have an effect of causing destructive interference for high spatial frequency components of red and blue light passing therethrough.

It is well known that the high spatial frequency component of a light of a certain wavelength is filtered through a fine striped filter layer having a thickness of an integral number and a half times as large as said wavelength. On the other hand, if the striped filter layer has a thickness of an integral number of times as large as the wavelength, the light wholly passes through the filter layer throughout all the wavelengths thereof.

In general, the striped filter layers employed in this invention are set to cause a phase shift of $0\lambda$, $N\lambda$, $2N\lambda$ . . . $(m-1)N\lambda$ ($m$ and N are positive integral numbers) for a particular wavelength $\lambda$ of the light required to focus a sharp image of high resolving power, which is normally green light.

In the embodiment shown in FIGS. 1 and 2, the number $m$ is set to be 4, that is, the striped filter layers are composed of parallel stripes of bare surface 4 of the transparent substrate 2 which causes zero phase shift, first parallel stripes of a filter layer *3a* deposited on the substrate 2 having such a thickness $d$ as to cause a phase shift of $N\lambda$, second parallel stripes of a filter layer *3b* deposited on the substrate 2 in parallel to said first parallel stripes of a filter layer *3a* having such a thickness ($2d$) as to cause a phase shift of $2N\lambda$, and third parallel stripes of a filter layer 3c deposited on the substrate 2 in parallel to said first and second parallel stripes of filter 3a and 3b having such a thickness 3d as to cause a phase shift of 3Nλ. There is no restriction with respect to the order of arrangement of and the number of each kind of the parallel striped filter layers 3a, 3b, 3c and 4, so long as the total amount of light passing through each kind of the filter layer is equal to each other. That is the total area of each kind of the striped filter is the same. The pitch or width of the stripes is also properly selected so as to satisfy the above conditions. It is preferred that the pitch of the stripes is randomly arranged.

In operation, the low-pass filter 1 constructed as described above is positioned at a lens aperture plane or close thereto of a taking lens system of a color television camera. When white light or light from the object passes through the lens system including the low-pass filter 1, the light having the particular wavelength λ, preferably green light, normally passes through the filter without being subject to a special effect because the phase shift caused by any of the filter layers 3a, 3b, 3c is an integral number of times as large as the wavelength λ. On the other hand, with respect to the light having a different wavelength from said λ, the light components passing through the different striped filter layers interfere with each other and the optical transfer function of the filter in the direction perpendicular to the stripes is markedly reduced with respect to high spatial frequency components of such light. It is possible to completely eliminate light of a wavelength of over a predetermined spatial frequency. The critical spatial frequency depends upon the pitch of the stripes on the filter.

Figure 3:
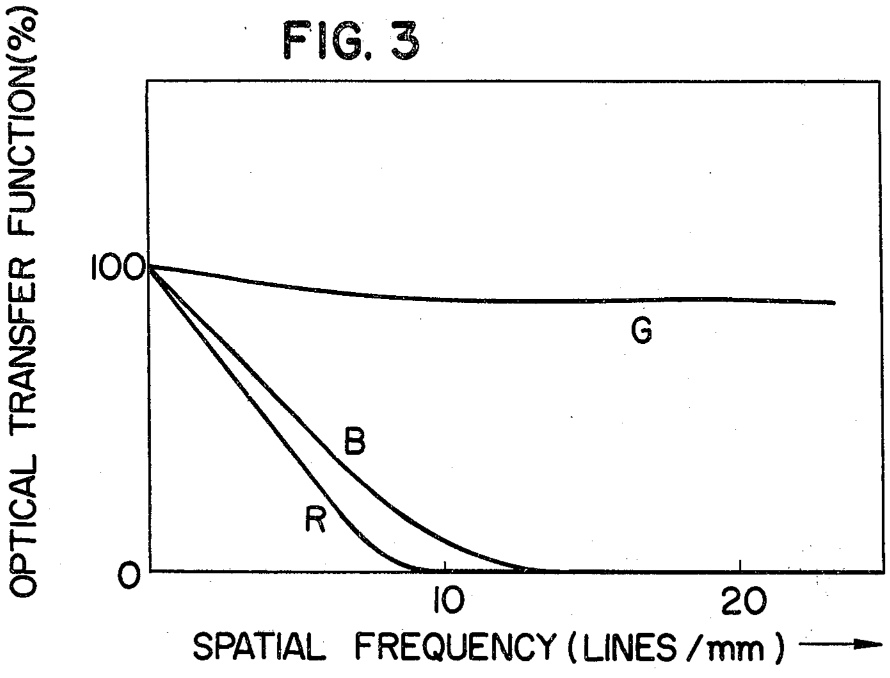
FIG. 3 is a graphical representation showing the optical transfer function of the filter of this invention with respect to the spatial frequency.

The optical transfer function of such a filter as described above, having an effect of eliminating the high frequency components of red and blue light and passing green light therethrough throughout all the spatial frequencies thereof, is shown in FIG. 3. In the graphical representation of the optical transfer function shown in FIG. 3, the flat line G represents the green light and the curves B and R having zero value in the high spatial frequency range represent the blue and red light respectively.

The optical transfer function of the filter in accordance with this invention with respect to the wavelength of the light passing therethrough will now be described in detail. Generally, the optical transfer function T of the low pass filter with respect to the wavelength for the light of high spatial frequency is represented by the following formula;

$$T = \left( \frac{1}{m} \cdot \frac{\sin \frac{mN\theta}{2}}{\sin \frac{N\theta}{2}} \right)^2$$

where $n$ is the refraction coefficient for a wavelength λ, $d$ is the unit thickness of the phase shifting filter layer, and $$\theta = 2\pi \frac{(n-1)d}{\lambda}.$$

The unit thickness $d$ is so determined as to satisfy $(n_o - 1)d = \lambda_o$, where $n_o$ is the refraction coefficient for a particular wavelength $(\lambda_o)$.

Figure 4:
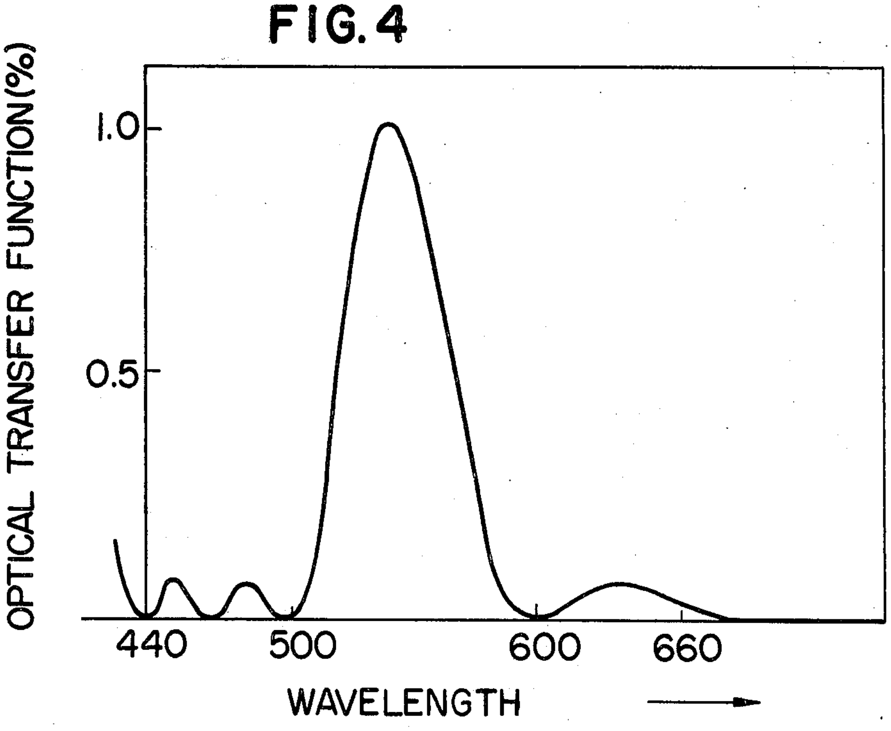
FIGS. 4 to 6 are graphical representations showing the optical transfer function of the filter of other embodiments of this invention with respect to the wavelength.
Figure 5:
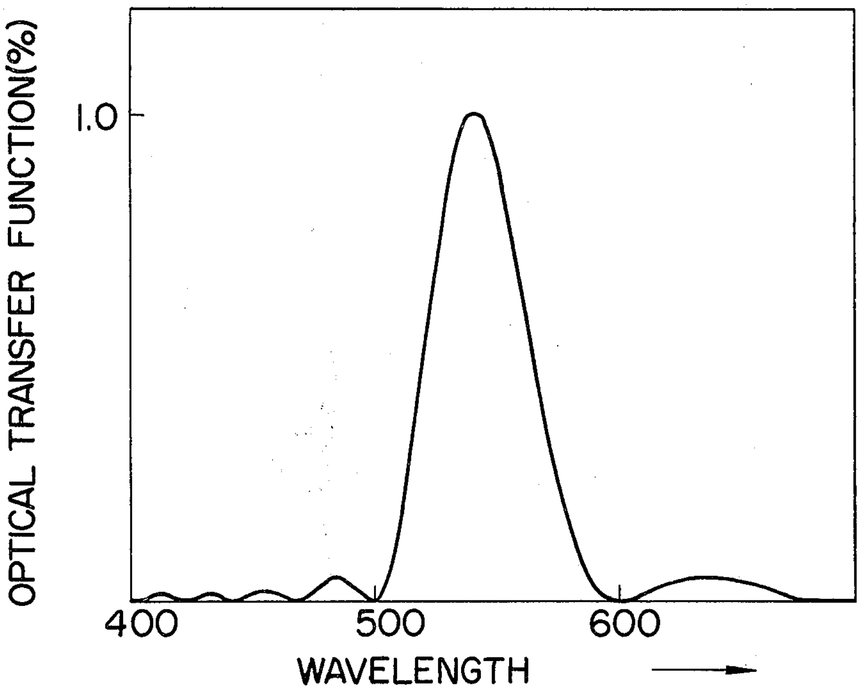

The λ − T curve, that is the optical transfer function with respect to the wavelength in case of $m$=4, N=2 is shown in FIG. 4 and of $m$=8, N=1 in FIG. 5.

With reference to these curves, it is understood that the optical transfer function is high at the particular wavelength and low in the range of other wavelengths.

Figure 6:
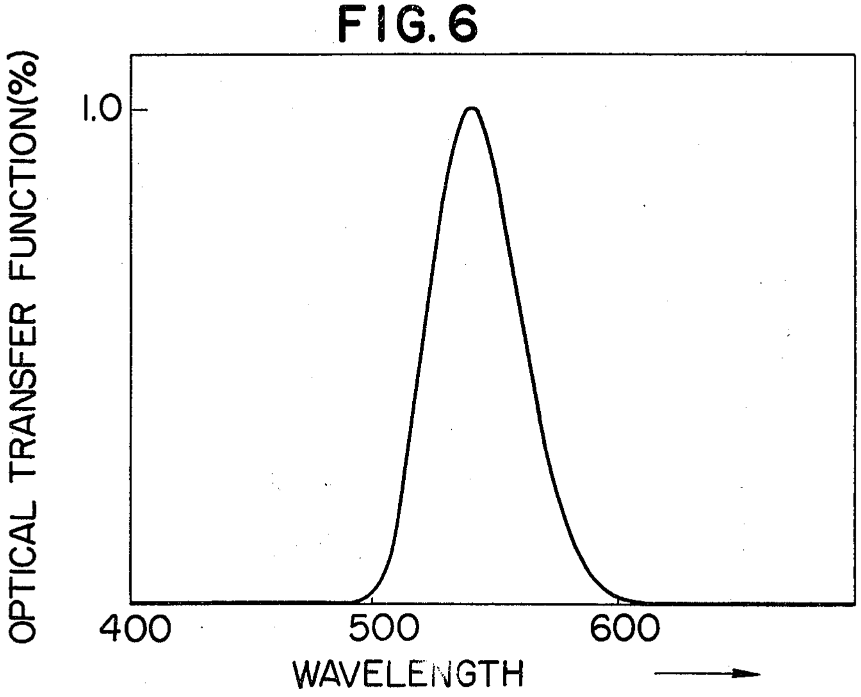

It is possible to use the above-described filters in double in superposed relationship so that the same pattern therein will not be superposed with each other. For instance, two filters of $m$=6 and N=1 constructed as described above are doubled to obtain consequently striped filter layers having the phase shift effect of 0, 1, 2 . . . 10 with the total area thereof made 1 : 2 : 3 : 4 : 5 : 6 : 5 : 4 : 3 : 2 : 1. Such a double filter has the optical transfer function as shown in FIG. 6.

It will be readily understood that a single filter bearing randomly pitched fine striped filter layers which have the effect of phase shifting of 0λ, Nλ, 2Nλ . . . $n$Nλ for the particular wavelength with the total light transmitting area thereof having a ratio of 1 : 2 : 3 : . . . : 3 : 2 : 1, respectively, should have the same effect as that of the foregoing double filter.

What is claimed is:

1. An optical low-pass filter in a taking lens system of a single-tube color television camera comprising a transparent substrate, and a plurality of transparent striped filter layers deposited on said substrate in parallel to one another and extending orthogonally to the direction of scanning of the electron beam in the television camera, the optical path difference $(n-1)d$ caused by said filter layers in the light incident orthogonally to the surface of the substrate being an integral number of times as large as the particular wavelength of the color of light to be filtered, where $n$ is the refractive index of the filter layer and $d$ is the thickness of the filter layer, whereby only the light having said particular wavelength is passed through the filter and the high spatial frequency components of the light having a wavelength different from said particular wavelength are eliminated by said filter by color-selective filtration.

2. An optical low-pass filter as defined in claim 1 wherein the width of said striped filter layers measured in a direction orthogonal to the stripes in randomly selected.

3. An optical low-pass filter as defined in claim 1 wherein the optical path difference is several different integral number of times as large as said particular wavelength so as to cause a plurality of phase shifts of 0λ, Nλ, 2Nλ . . . $(m-1)$Nλ, respectively, where λ is said particular wavelength and $m$ and N are positive integral numbers.

4. An optical low-pass filter as defined in claim 3 wherein the width of said striped filter layers measured in the direction orthogonal to the stripes is randomly selected and the ratio of the total area of the respective striped filter layers on the substrate having a thickness effecting the phase shifts of 0λ, Nλ, 2Nλ . . . $(m-1)$λN on the light of the wavelength passing therethrough is 1 : 2 : 3 : . . . : $(m+1)/2$ : . . . : 3 : 2 : 1, respectively.

* * * * *